Feb. 9, 1932.  A. P. WARNER  1,844,827
ELECTROMAGNETIC FRICTION DEVICE
Filed April 28, 1928   3 Sheets-Sheet 1

Inventor:-
Arthur P. Warner,
By Chindahl Parker Roulson
Attys.

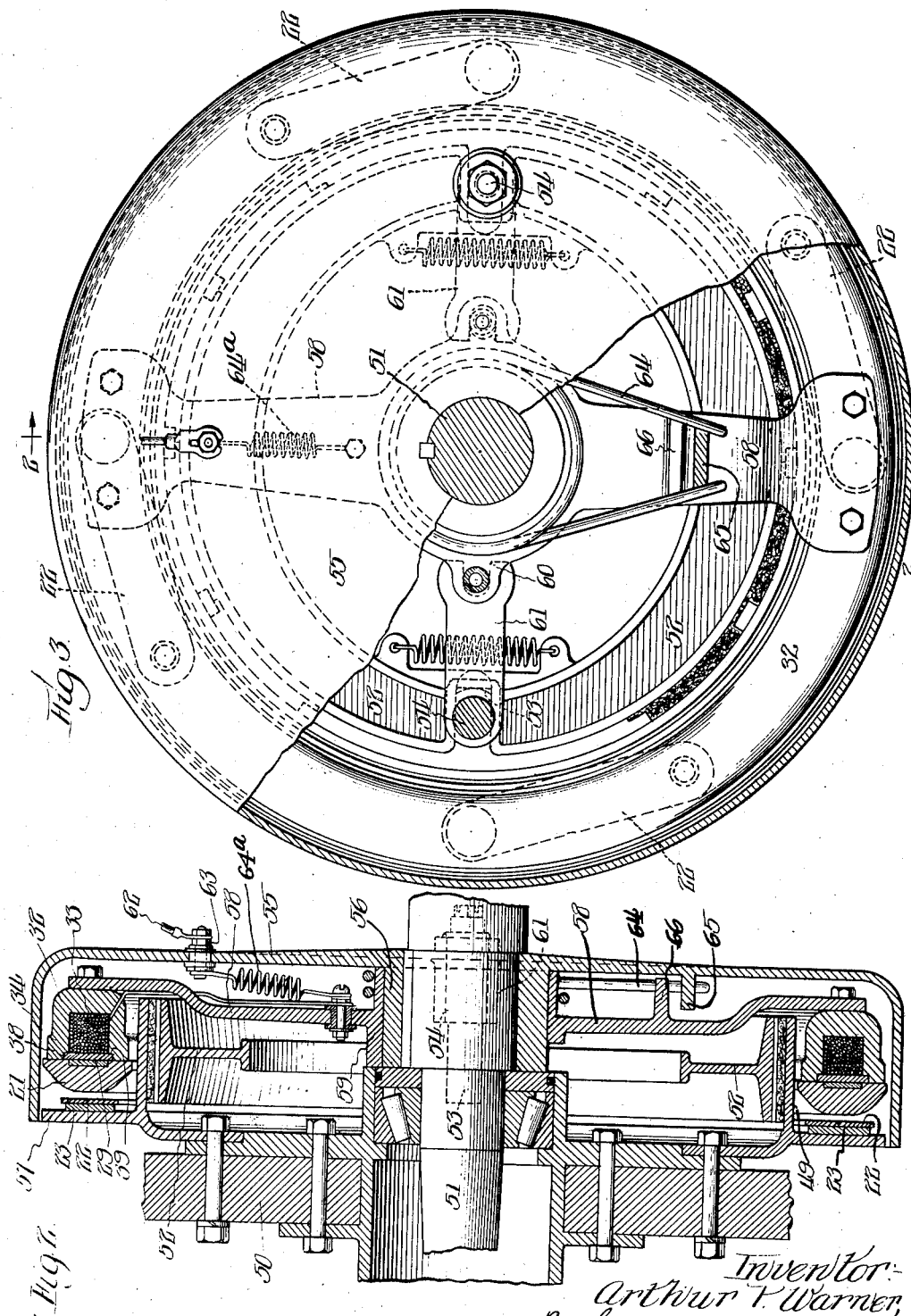

Feb. 9, 1932.  A. P. WARNER  1,844,827
ELECTROMAGNETIC FRICTION DEVICE
Filed April 28, 1928  3 Sheets-Sheet 3
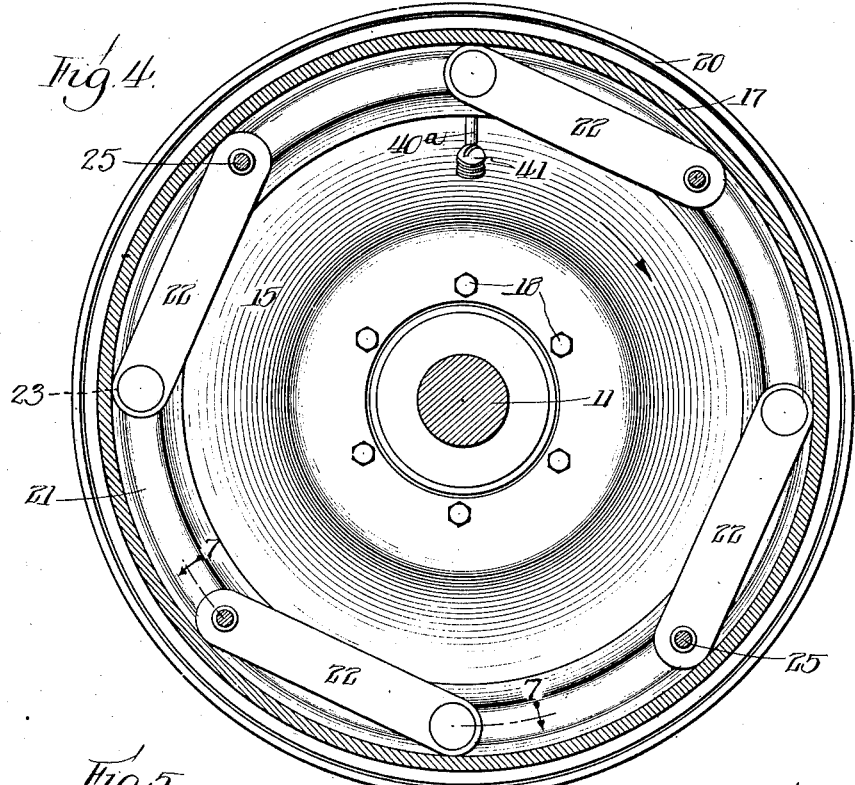
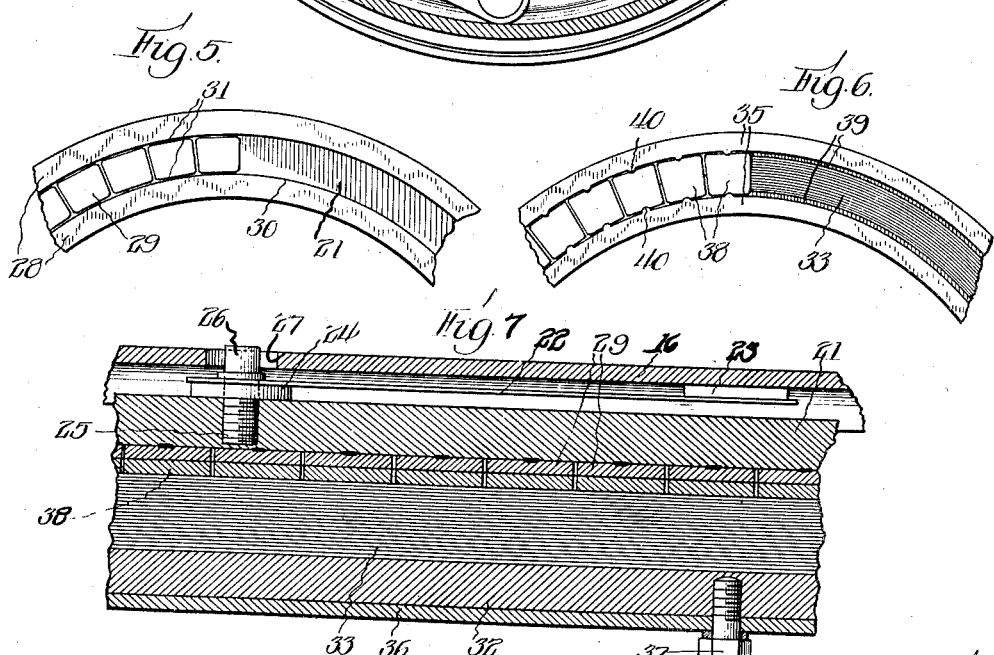
Inventor
Arthur P. Warner,
By Christal & Parker Carlson
Attys.

Patented Feb. 9, 1932

1,844,827

UNITED STATES PATENT OFFICE

ARTHUR P. WARNER, OF BELOIT, WISCONSIN, ASSIGNOR TO WARNER ELECTRIC BRAKE CORPORATION, OF SOUTH BELOIT, ILLINOIS, A CORPORATION OF ILLINOIS

ELECTROMAGNETIC FRICTION DEVICE

Application filed April 28, 1928. Serial No. 273,706.

This invention relates generally to improvements in electromagnetic friction devices and more particularly to devices wherein the motion of a part is controlled by the frictional gripping engagement between two relatively movable annular elements, the force of which engagement is governed by electromagnetic action.

In the use of devices of the above character, particularly in brake operators, it has been found desirable to urge the friction elements resiliently into continuous mechanical contact at their friction faces in order to avoid the detrimental effect of the variable air gap which would otherwise exist in the magnetic circuit through the elements due to wear and allowable inaccuracies in manufacture and mounting. To permit such contact to be maintained at all times during the inherent lateral wobbling of the rotatable friction element, it is necessary that one of the elements be mounted for a limited degree of floating axial movement.

The primary object of the present invention is to provide a new and improved mounting for one of the friction elements in the environment above described, which mounting, by reason of its frictionless character, eliminates wear of the supporting parts due to lateral wobbling of the elements and enables the pressure of mechanical contact maintained between the friction faces to be reduced to a minimum and rendered substantially invariable, thereby minimizing wearing off of said friction faces.

In carrying out this object, the invention contemplates the use of a plurality of elongated flat flexible strips annularly spaced about the annular element to be supported with their opposite ends secured to the element and the supporting structure so that each strip constitutes a secant of said element and by lateral flexure permits axial wobbling of the element.

Another object is to provide a mounting of the above character including means for sustaining the rotational torque when they are placed under longitudinal compression thereby preventing buckling of the strips.

A further object is to mount a magnetic element with the supporting strips arranged as above described and so stressed that the inherent resiliency in the strips serves to maintain the element in light mechanical contact with its coacting element.

Other objects and advantages of the invention will become apparent from the following detailed description taken in connection with the accompanying drawings, in which Figure 1 is a vertical sectional view of an electric vehicle brake embodying the features of the present invention, the electrical control circuits therefor being shown diagrammatically.

Fig. 2 illustrates the invention incorporated in a vehicle brake of the so-called momentum type, the brake being shown in central section along the line 2—2 of Fig. 3.

Fig. 3 is a fragmentary elevational view of the brake shown in Fig. 2.

Fig. 4 is a sectional view taken along the line 4—4 of Fig. 1.

Figs. 5 and 6 are fragmentary views showing the coacting faces of the two friction elements of the brakes.

Fig. 7 is a section taken along the line 7—7 of Fig. 4.

Figure 1:
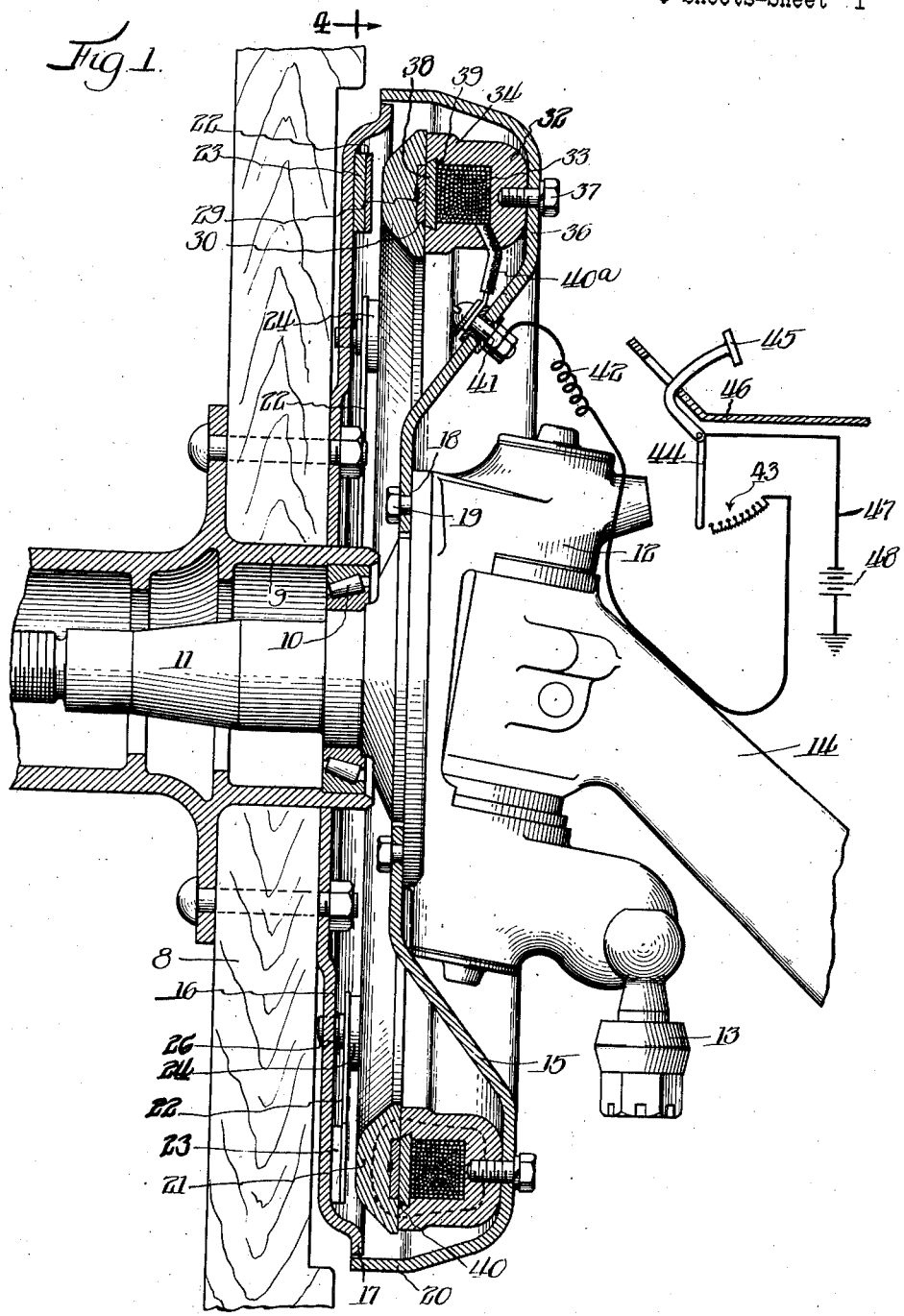

While I have shown in the drawings and will herein describe two preferred adaptations of the present invention to electromagnetic friction devices, it is to be understood that I do not intend to be limited thereby to these adaptations nor to the structures therein disclosed but aim to cover all modifications and alternative constructions falling within the scope of the invention as expressed in the appended claims.

In the drawings the invention is shown for purposes of illustration embodied in electromagnetic friction devices for arresting the motion of a rotatable part, the rotatable part, in each instance, being the wheel of an automotive vehicle and the friction device constituting a brake for the wheel. The form first to be described because of its structural simplicity and shown particularly in Fig. 1 is a friction brake of the direct-acting magnetic type associated with a front or dirigible wheel 8 having a hub portion 9 which is mounted in the usual way through bearings 10 on a spindle 11 formed integral with a forked steering knuckle 12. The latter carries the usual steering arm 13 and is received on the end of the front axle 14 to which it is pivotally connected.

Generally stated, the brake shown in Fig. 1 comprises two annular friction elements, one of which rotates with the wheel 8, the other being stationarily mounted and carrying an electromagnetic winding which, when energized, produces an extremely powerful force of magnetic attraction between the elements, the frictional force developed by such axially acting force serving to retard the motion of the rotatable element and therefore the vehicle wheel. Preferably the two magnetic elements are mounted within a closed annular space defined by a casing 15 and a substantially flat disk 16 bolted to the wheel on the inner side thereof and having an inturned peripheral flange 17.

The casing is received on and secured to a shoulder 18 on the knuckle as by bolts 19 and is shaped to provide a central inwardly opening recess for receiving the steering knuckle when the brake is applied to a front automobile wheel. A flange 20 on the casing projects over the flange 17 and thereby encloses the operating elements of the brake.

In the present instance, the rotatable element of the brake constitutes the magnet armature and comprises a ring 21 composed of soft highly permeable iron and having a diameter slightly less than the disk 16. The ring is of relatively narrow radial width and is supported on a frictionless or freely floating mounting which allows for yielding of the ring in an axial direction to compensate for the inherent lateral wobble of the vehicle wheel.

This floating mounting is provided by a plurality of members resiliently supporting the armature and constructed to sustain the torque resulting from the frictional drag on the face of the armature during operation of the brake. Herein, this mounting comprises a plurality of elongated strips 22 of flat and relatively thin sheet metal preferably spring steel. The strips are disposed flatwise between the armature and the plate 16 and are arranged in annularly spaced relation as shown in Fig. 4 and in a plane substantially parallel to the friction face of the armature. Each strip extends substantially tangentially of the ring and virtually constitutes a secant thereof with its opposite ends rigidly secured to the disk 16 and the ring 21 respectively at points substantially equidistant from the axis of rotation thereof. The leading end of each strip as determined by the rotation of the wheel during forward motion of the vehicle may be attached as by "spot" welding to a spacer block 23 (Fig. 7) which in turn may be welded to the inner surface of the disk 16 near the periphery thereof. The other or trailing end of the strip is clamped against a spacer block 24 on the flattened back of the armature ring by a bolt 25 (Fig. 7) threading into the ring and having a head 26, the reduced end of which projects through an aperture 27 in the disk 16, the aperture being slightly larger in diameter than the bolt head.

With the arrangement above described, the armature ring 21 is supported accurately in concentric relation with respect to the wheel axis and is adapted to float freely in an axial direction as is permitted by lateral flexure of the strips 22. Thus a frictionless mounting is provided which allows the armature to wobble laterally in the rotation of the wheel without danger of binding or without frictional wear of the supporting parts which would quickly destroy the accuracy of the armature mounting in a vehicle brake structure.

The springs 22 are disposed closely adjacent and substantially parallel to the plane of rotation of the ring so that when a frictional drag is applied to the face of the ring, the springs will be placed under longitudinal tension or compression depending on the direction of rotation of the vehicle wheel. Under the condition of tension, the rotative torque will be sustained by the springs 22 as a pull applied in a truly endwise direction so that there will be no tendency for the springs to buckle. Thus, the ring is held against rotation relative to the disk 16. When the direction of rotation is such as to place the springs 22 under compression, there will be a tendency of the flat springs to buckle under the force applied endwise thereof. Actual buckling will, however, be prevented by engagement between the bolt heads 26 and the edges of the apertures 27 which occurs after a very small angular movement of the plate 16 relative to the armature.

For purposes which will later appear, the spring strips 22 are initially stressed so that they normally tend to bow inwardly away from the disk 16, thereby continuously urging the armature ring 21 inwardly along the wheel axis and into mechanical contact with the core of the magnet to be presently described. Thus, while the ring itself is substantially rigid and effectually held against angular movement in either direction relative to the wheel, the strips are free to flex laterally of their length and thereby allow for axial yielding of the ring at any point around its circumference as may be required by the lateral wobble of the part on which the ring is carried.

The armature ring 21 has a flat inwardly facing surface with concentric outer and inner portions 28 (Fig. 5) disposed in a common plane and constituting terminal ends of a path for the flow of magnetic flux through the metallic armature. To prevent wear at these relatively soft surfaces, plates 29 such as steel having a high manganese content are arranged in end-to-end relation in a shallow groove 30 in the armature ring between the surfaces 28.

To allow for uneven lateral and longitudinal expansion of the plates relative to the ring 21, the plates 29 are made slightly narrower than the groove 30 and in short lengths and attached individually to the armature so as to be spaced apart a slight distance at their adjacent ends.

As a further provision against warping of the flat wear surfaces by the uneven thermal expansion between the plates 29 and the ring 21, each plate is preferably secured to the armature ring at a single point. This may be accomplished economically by "spot" welding so as to reduce the area of the point of integral attachment, which point preferably is at the center of the plate.

The final step in the construction of the armature ring is to grind the face thereof so as to make the plate surfaces and the faces 28 perfectly flat and in a common plane disposed at right angles to the ring axis.

The stationary element of the present brake constitutes an extremely powerful electromagnet and is formed by a ring-shaped core 32 of U-shaped cross section enclosing a winding 33 which may be energized from a storage battery or other source of current. The winding comprises a continuous insulated conductor wound in a succession of turns to form an annulus of such size as to fit into the groove defined by the concentric flange portions 34 of the core. These flange portions constitute the poles of the magnet and their ends are made substantially flat so as to define two concentric pole faces 35 (Fig. 6) disposed in a common plane perpendicular to the axis of the core 32 and of a diameter corresponding approximately to the faces 28 on the armature ring 21.

The magnet core is stationarily supported concentric with the wheel axis so as to cooperate with the armature 21 in forming a substantially closed metallic flux circuit encircling the winding 33. To this end, the core 32 is formed with a flat back surface which is clamped against a flat portion 36 of the casing 15 by screws 37 extending through the casing and threading into the core.

Wear plates 38 similar to the plates 29 are mounted between the poles 34 flush with the faces thereof and may be secured against endwise movement by peening the adjacent portions of the soft flanges 34 of the poles into notches 40 in the plates.

The surfaces of the magnet are also ground to perfect flatness and brought into a common plane for cooperation with the corresponding surfaces of the armature ring. Thus when the magnet and its armature are mounted as above described, the surfaces of the plates 29 and 38 will be in actual mechanical contact around the entire circumference of the magnet, this relation being maintained at all times by the action of the leaf springs 22 which, as above described, are stressed to urge the armature ring axially away from the disk 16. In view of the intimate contact between the wear plates, the pole faces 35 and the armature faces 28 will be maintained substantially in contact at all times. An air gap of infinitely small width would, however, develop in the initial operation of the friction device by the wearing off of the soft pole faces 35 and the armature faces 28 until the entire pressure of the engagement between the elements is sustained by the wear plates. Such an air gap would be so small as to be insignificant in its effect on the attractive pull of the magnet and would be maintained constant by the springs 22 thereby compensating automatically for wear and the inherent lateral wobbling of the vehicle wheel which latter would tend to produce an air gap and vary the width thereof in the absence of means such as the springs 22.

The maintenance of a continuous light pressure between the magnetic elements as distinguished from the pressure of magnetic attraction constitutes an additional source of frictional wear at the coacting surfaces of the elements. But owing to the lightness of the armature and the frictionless character of its mounting, the magnitude of the spring effect required to insure the maintenance of such contact and therefore the wear at the friction faces when the magnet is deenergized, may be reduced to a minimum. Moreover, the strips 22 possess a high degree of resiliency by reason of their length and thinness so that by utilizing their resiliency to urge the magnetic elements into contact, the contact pressure is substantially invariable throughout the normal range of lateral wobbling which is tolerable in modern vehicle wheel assemblies. It will be observed that the use of such long strips is made possible in the present instance by arranging the strips as secants of the annular armature. This arrangement is further advantageous in that it is of narrow radial width thereby providing a large central recess for location of the steering knuckle 12 close to the plane of rotation of the wheel. The only severe stresses which the strips are called upon to sustain are applied longitudinally. Thus there is no tendency of the strips to buckle by lateral twisting.

Since the axial pressures between the elements caused by the action of the springs 22 or to the force of magnetic attraction are sustained by the plates 29 and 38 which the core 32 and the ring 21 support, the latter may be formed of soft iron having high magnetic permeability and low residual magnetism, that is, low flux density at the pole faces when the energizing circuit for the winding is interrupted. For the same reason, the pole faces 35 may be made of minimum radial width and therefore of minimum area which is determined by the current to be supplied to the winding in producing the maximum retarding effect with the brake. This area is intended to be such that with the maximum current which can be supplied to the winding 33 by the control mechanism to be presently described, the flux density at the pole faces approximates the flux saturation point of the material of which the core is made, this point, for soft iron, being approximately 105,000 flux lines per square inch.

Thus, by utilizing a material having minimum residual flux density and by minimizing the pole face areas, the total residual magnetism, which is a combination of these two factors, has been reduced to a minimum. It is possible therefore to render the friction device ineffectual instantly by interrupting the energizing circuit which is completely within the manual control of the vehicle driver or other operator.

With the strips 22 arranged as above described, the true frictionless character of the armature mounting and the smooth and readily controllable braking action which has been found to result therefrom is maintained during energization of the magnet when the direction of rotation of the vehicle wheel is such as to place the strips under tension, that is, when the vehicle is moving forwardly. Objectionable rubbing of the coacting surfaces of the stops 26 and 27 thus occurs only when the magnet is energized with the vehicle moving backwardly which is rather infrequently as compared with the number of brake applications which are made with the vehicle moving forwardly.

The magnet winding 33 may be energized from a source of current of relatively low capacity such as the storage battery commonly provided on automotive vehicles, and the degree of such energization may be controlled by means such as a rheostat. For this purpose, one terminal end of the winding 33 is preferably grounded to the magnet core 32 while the other end, indicated at 40ª, is extended through the core and attached to the inner end of an insulated binding post 41 mounted on the casing 15. The outer end of the post constitutes an anchoring point for one end of a flexible conductor 42 which is supported by the vehicle frame structure and extended to one terminal on a rheostat 43. The movable element 44 of the rheostat may be arranged for actuation by a foot pedal 45 projecting through the floor board 46 of the vehicle, the element 44 being connected by a conductor 47 to one terminal of a storage battery 48. To complete the energizing circuit for the winding, the other terminal of the battery is grounded to the vehicle frame.

Thus, by depressing the pedal 45 different distances, the strength of the energizing current in the winding 33 and therefore the degree of braking action obtained can be governed at the will of the vehicle driver.

The adaptation of the present invention illustrated in Figs. 2 and 3 will now be described briefly. This brake is of the so-called momentum type, that is to say, a brake wherein the frictional force derived through the gripping engagement of two friction elements is augmented mechanically and applied to an ordinary drum type of brake. The particular form of momentum actuating mechanism which is shown herein to illustrate the adaptation of the invention as above described to momentum brakes forms the subject matter of my copending application Serial No. 259,050, filed March 5, 1928, to which reference may be had for further details.

The brake proper is of the internally expansible type comprising a drum 49 carried on the inner side of a wheel 50 on a dead axle 51 and a pair of segmental shoes 52 mounted within the drum in end-to-end relation. Disposed between the adjacent pairs of end portions of the shoes are expanding cams 53 which are rigid with rock shafts 54 journaled in an enclosing casing 55 stationarily mounted as by keying the hub 56 thereof to the axle 51. The cams 53 thus serve to hold the shoes against rotation and are adapted to expand the shoes when oscillated in either direction from their normal brake-released position.

The coacting friction elements, by which the actuating force is derived from the momentum of the vehicle when in motion, are identical in construction to those employed in the direct-acting type of brake above described save for size, number of turns etc., and the parts thereof are therefore numbered for convenience to correspond to the above disclosure. The springs 22 supporting the armature 21 are, in this instance, secured to an external flange 57 formed on the drum near the closed end thereof. An oscillatory mounting is provided for the magnet, this comprising a pair of radial arms 58 screwed at their outer end to the back of the magnet ring 32 and carried by a hub 59 rotatably mounted on the casing hub 56.

To apply the actuating force to the expanding cams 53, short arms 60 are formed integral with the hub 59 and each carries a roller stud which is received in the bifurcated end of a crank arm 61. The crank arms are normally disposed in radial position and are rigidly secured to the respective rock shafts 54 for actuation of the expanding cams 53. It will be observed that the arms 58 and 60 form a bell-crank lever which, together with the crank arms 61 and the expanding cams 53, constitute powerful force-multiplying connections for transmitting the frictional force derived near the periphery of the drum to the ends of the brake shoes which are also located adjacent the drum periphery.

An energizing circuit similar to that above described may be provided for the present brake, a flexible conductor 62 being anchored to a binding post 63 with its inner end connected to the winding 33 through the medium of a resilient spring 64 which allows for oscillation of the magnet in either direction away from its normal brake-released position.

In the operation of this brake, energization of the magnet winding attracts the armature with a force proportional to the energizing current flowing in the winding, the frictional force thus developed between the manganese steel surfaces serving to carry the magnet along with the rotating armature. This moves the bell crank angularly away from its brake-released position, thereby oscillating the crank arms 61 to expand the brake shoes against the drum. When the shoe clearance has been taken up, which requires only a small fraction of one revolution of the armature, the reaction of the drum causes frictional slippage between the magnet and the armature and this allows for continued rotation of the drum, the brake remaining set. Upon deenergization of the winding 33, one arm of a spring 64ª acting on a lug 65 serves to restore the parts of the force-augmenting mechanism to brake-released position, this position being determined by engagement between the spring arm and a stationary lug 66.

It will be observed that in the momentum brake environment just described, the particular magnet structure functions in the same manner and possesses all of the advantages that are present when the structure is incorporated in a direct-acting magnetic brake or other friction device. The momentum type of brake, however, is more powerful in its action than the direct-acting brake and therefore is the preferred form to be used on heavy vehicles and on the rear wheels of most pleasure cars.

I claim as my invention:

1. An electromagnetic friction device having, in combination, a pair of relatively movable magnetic elements having coacting friction surfaces, and spring means providing a frictionless free floating mounting for one of said elements, said spring means being initially under stress and operable to urge the element supported thereby into mechanical contacting engagement with the friction surface on said other element.

2. In an electromagnetically controlled friction device having a pair of annular elements with coacting friction surfaces, means providing a floating mounting for one of said elements comprising a support and a plurality of flexible metal strips, each disposed substantially tangentially of and in a plane parallel to the friction surface of the element mounted thereon, said strips being secured at one of their ends to said support, the other ends being secured to said last mentioned element at spaced points around its periphery and adapted by lateral flexure to permit axial floating of the element supported thereby relative to said support.

3. An electromagnetically controlled friction device comprising, in combination, a pair of magnetic elements having coacting friction surfaces and adapted for relative rotational movement, a support for one of said elements and a plurality of elongated flexible metal members connecting said support and one of said elements so as to receive as an endwise thrust the frictional force produced by the gripping engagement of said surfaces when said elements are magnetized, said members being adapted for flexure transversely of their lengths so as to permit floating movement of the supported element laterally of the plane of rotation of the movable element.

4. An electromagnetically controlled friction device comprising, in combination, a pair of magnetic elements having coacting friction surfaces and adapted for movement relative to each other in opposite directions, a winding adapted when energized to cause gripping engagement of said surfaces, a support for one of said elements, an elongated member connecting said support and said last mentioned element and disposed in a plane substantially parallel to the path of relative movement between the elements so as to be placed under tension and compression respectively upon gripping engagement of said elements while moving in opposite directions relative to each other.

5. An electromagnetically controlled friction device comprising, in combination, a pair of magnetic elements having coacting friction surfaces and adapted for movement relative to each other in opposite directions, a winding adapted when energized to cause gripping engagement of said surfaces, a support for one of said elements, an elongated flexible member connecting said support and said last mentioned element so as to be placed under tension and compression respectively upon gripping engagement of said elements while moving in opposite directions relative to each other, and means operable to limit relative movement between said support and the element supported thereby when said member is placed under compression and thereby prevent buckling of said member.

6. In an electromagnetic friction device, the combination of a pair of annular elements mounted for relative rotation and for axial gripping engagement, a supporting member and a plurality of flexible strips of metal disposed substantially parallel to the plane of rotation of the rotatable element and each rigidly connected to said member and to one of said elements at points substantially equidistant from the axis of rotation of the rotatable element so as to be placed either under tension or compression in sustaining the rotational torque produced by the gripping engagement of the elements.

7. In an electromagnetically controlled friction device having a pair of annular elements with coacting friction surfaces, means providing a floating mounting for one of said elements comprising a support, a plurality of metal strips, each disposed substantially tangentially of and in a plane parallel to the friction surface of the element mounted thereon, said strips being secured at one end of their ends to said support, the other ends being secured to said last mentioned element at spaced points around its periphery, and two members rigid respectively with said floating element and said support and adapted to interengage and thereby prevent buckling of said strips when the strips are placed under compression by the gripping engagement of said elements.

8. In an electromagnetically controlled friction device having a pair of annular elements with coacting friction surfaces, means providing a floating mounting for one of said elements comprising a support, a plurality of metal strips disposed in annularly spaced relation adjacent one of said elements and each extending substantially tangentially of and having one end rigidly secured to said last mentioned element, the other ends of said strips being rigidly secured to said support, and means to limit the relative rotational movement between said elements when said strips are placed under compression.

9. In a brake for the wheel of a vehicle in which the braking action is governed by the degree of frictional gripping engagement between two relatively rotatable magnetic elements, a means floatingly supporting one of said elements for axial engagement with the other element comprising a supporting member and a plurality of metal strips connected at one end to said member and at the other end to said last mentioned element so as to be placed under longitudinal tension upon the gripping engagement of the elements when the vehicle is moving forwardly, and under compression upon gripping engagement of the elements when the vehicle is moving backwardly.

10. In a brake for an automotive vehicle wheel, the combination of a casing defined by a non-rotatable part and a second part carried by said wheel, a magnet supported within said casing by said non-rotatable part and having an annular friction face, an armature for said magnet having an annular friction face adapted for gripping engagement with said magnet face, and means supporting said armature within said casing for rotation with said rotatable part and for floating axial movement comprising a plurality of elongated flat strips of thin flexible sheet metal disposed between said rotatable part and the armature in a plane substantially parallel to the plane of rotation of said wheel and positioned as secants of said armature, the opposite ends of each strip being rigidly secured to said armature and rotatable part respectively.

11. In an electromagnetic friction device, the combination of a magnetic element having an annular friction face, the second magnetic element having a friction face adapted for gripping engagement with said first mentioned face, a support, and a plurality of elongated flat strips of thin sheet metal disposed in a plane substantially parallel to said friction faces and positioned as secants of said elements, each of said strips having one end rigidly secured to said support and the opposite end rigidly attached to one of said elements on the side thereof opposite the friction face of the element thus supported.

12. In an electromagnetic friction device, the combination of a pair of annular magnetic elements having coacting friction faces and arranged for relative rotational movement about a horizontal axis, a support, and a plurality of elongated strips of resilient metal annularly spaced around said elements and each having its opposite ends attached to said support and one of said elements respectively at points substantially equidistant from the axis of the elements so that by lateral flexure of the strips the element supported thereby is adapted for some degree of axial floating movement relative to said support, the resiliency inherent in said strips acting to urge the supported element along said axis and toward the other element, thereby maintaining continuous mechanical contact between said friction faces.

In testimony whereof, I have hereunto affixed my signature.

ARTHUR P. WARNER.